UNITED STATES PATENT OFFICE.

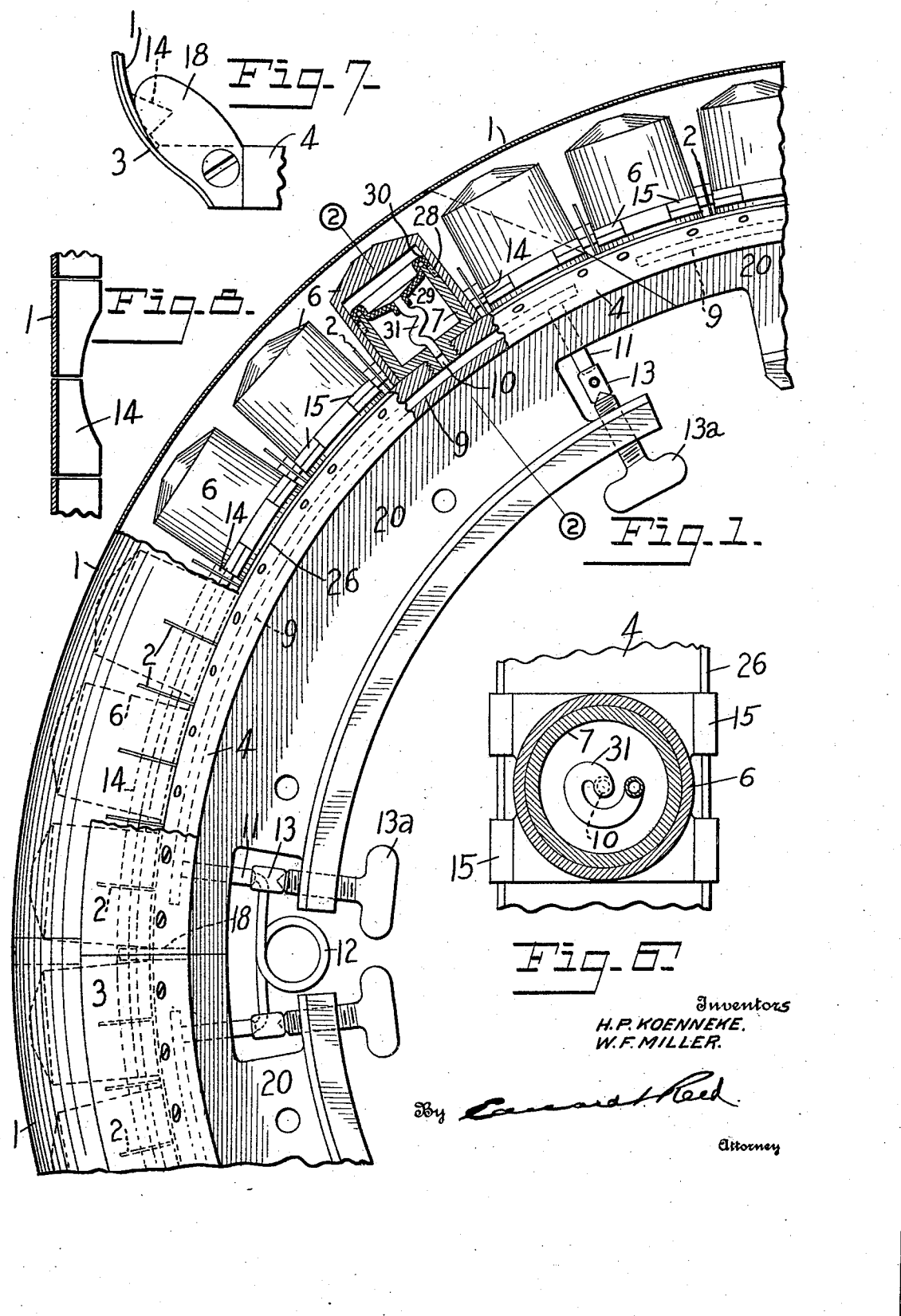

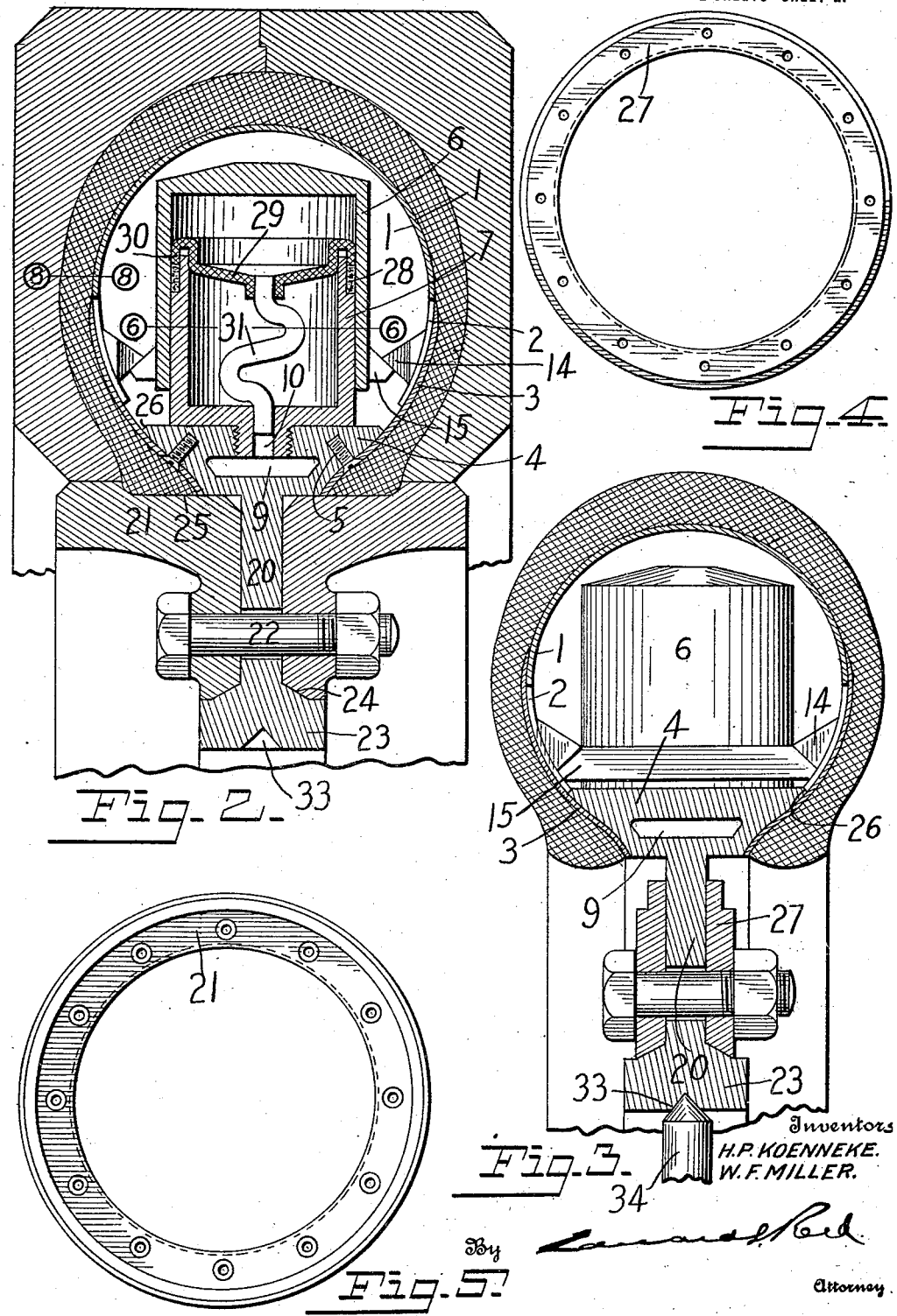

HARRY P. KOENNEKE AND WALTER F. MILLER, OF DAYTON, OHIO; SAID KOENNEKE ASSIGNOR OF HIS ENTIRE RIGHT TO GEORGE E. KELLER, OF DAYTON, OHIO.

EXPANSIBLE CORE.

1,420,488.  Specification of Letters Patent.  Patented June 20, 1922.

Application filed October 24, 1921. Serial No. 509,958.

*To all whom it may concern:*

Be it known that we, HARRY P. KOENNEKE and WALTER F. MILLER, citizens of the United States, residing at Dayton, in the county of Montgomery and State of Ohio, have invented certain new and useful Improvements in Expansible Cores, of which the following is a specification, reference being had therein to the accompanying drawing.

This invention relates to expansible metallic cores and is designed more particularly for curing and repairing automobile tires and the like.

One object of the invention is to provide a metallic core having means for causing the same to exert pressure on all parts of the tire casing during the curing operation.

A further object of the invention is to provide a core of this kind of such a character that the tire can be built up on the same, thus enabling the tire to be built on the same core on which it is cured.

A further object of the invention is to provide a device of this kind which will be easy to operate, highly efficient in operation and of a strong, durable character.

Other objects of the invention will appear as the device is described in detail.

In the accompanying drawings Fig. 1 is a side elevation, partly in section, of a portion of an annular core embodying our invention; Fig. 2 is a transverse sectional view taken on the line 2—2 of Fig. 1, showing the core and tire within the mold; Fig. 3 is a similar section showing the core mounted for building the tire thereon; Fig. 4 is a detail view of one of the clamping rings for the building core; Fig. 5 is a detail view of one of the clamping rings for the curing core; Fig. 6 is a section taken on the line 6—6 of Fig. 2; Fig. 7 is a fractional detail view showing one of the alining stops; and Fig. 8 is a section on the line 8—8 of Fig. 2.

The present invention is in the nature of an improvement upon the core shown and described in the application for patent filed by Walter F. Miller, on June 24, 1921, Serial No. 479,994.

In the present drawings we have illustrated one embodiment of our invention but it will be understood that this particular embodiment has been chosen for the purpose of illustration only and that the device may take various forms.

In that embodiment of the invention here illustrated the core comprises a main casing 1 of resilient sheet metal and shaped to fit within the tire which is to be cured. The casing preferably comprises a plurality of segmental sections adapted to be connected one with the other to form an annular core upon which a tire may be built and cured. The sections are separable to permit the core to be removed from the tire, and a single section, either a section of the annular core or an independent section, may be used for vulcanizing a section of the tire in connection with repair work, and such a section would constitute a complete core. We will, therefore, describe the construction and operation of a segmental section and it will be understood that this description applies to all the sections of an annular core. The segmental, tubular main casing 1 is divided along one side thereof, preferably along that side thereof adjacent to the edge portions or beads of the tire, and in the present construction the edges of the casing, along the line of division, are spaced a considerable distance apart. We also prefer to provide the casing with slots 2 formed in the edge portions thereof and extending transversely to the line of division. In the present instance these slots are radial to the segmental section. Cooperating with the main casing 1 is a supplemental casing comprising aprons, or shields 3 shaped to fit between the edge portions of the tire and overlapping the slotted edge portions of the main casing. The aprons 3 are rigidly secured to a pressure member 4 extending lengthwise of the casing and adjacent to the separated edges thereof. This pressure member is shaped to fit between the edge portions of the tire and the aprons are secured thereto in any suitable manner, as by means of screws 5, so that when the pressure member is forced outwardly pressure will be applied to the edge portions of the tire.

Suitable means are provided for expanding the main casing and applying pressure to the supplemental casing, thus causing pressure to be applied to all parts of the tire. As here shown, we have mounted within the main casing a plurality of actuating devices, each comprising two parts movable toward and from one another. One of these parts is arranged to act upon the main casing, preferably upon the edge portions thereof, to expand this casing, while the other part of each device is connected with the pressure member 4. In the present construction the actuating devices are fluid operated and we have shown each of them as comprising a cylinder 6 closed at its outer end, that is, the end adjacent to the tread of the tire, and having mounted therein a piston 7 carried by, and in the present instance, rigidly secured to, the pressure member 4, it being understood that the pistons of the several actuating devices in each section of the core are connected with the single pressure member for that section.

As here shown, the piston is made hollow to reduce its weight but it will be understood that it may be of any suitable construction. Fluid under pressure, preferably air, is admitted to the cylinder through the pressure member and the piston and, as here shown, the pressure member is provided with a longitudinal conduit 9 communicating with each hollow piston by a port 10 and provided at one end of the core section with a nipple 11 by means of which it may be connected with a suitable source of fluid supply. Where the sections are used independently, as in repair work, the conduit 9 is closed at that end opposite the inlet nipple 11 and where the sections are assembled to form an annular core the conduits of adjacent sections are connected by a suitable coupling 12, with the exception of those ends of the conduits adjacent to the inlet 11. The end of the conduit in that section adjacent to the inlet 11 is plugged, or otherwise closed. In this manner the air admitted to the conduit through the inlet 11 is distributed throughout the annular core to all the actuating devices.

The coupling 12 between the nipples at the adjacent ends of the core sections may take any suitable form, but as here shown the coupling is in the form of a flexible conduit, such as a copper tube, having at its ends sockets, or coupling members 13. A conduit in each socket member leads from the end of the tube 12 to the end of the socket member, which is recessed to receive the end of one of the nipples 11. To establish the connection between the two nipples 11, the socket members of the coupling are placed in contact with the two nipples and are clamped firmly in contact therewith, as by means of thumb screws 13ª mounted in any suitable part of the structure, such as one of the clamping rings. This character of coupling not only enables the core section to be very quickly and easily connected with and disconnected from one another, but it is flexible and will accommodate itself to any variation in the positions of the nipples.

When the air or other fluid under pressure is admitted to the actuating devices it will tend to force the cylinder toward the tread of the tire and this movement is utilized to expand the casing and exert pressure on the tire. The cylinder may be connected with the main casing, to expand the same, in any sitable manner, but in the present construction we have provided the edge portions of the main casing with inwardly extending lugs 14 which are rigidly secured thereto at points spaced a slight distance from the edges of the casing. The cylinder is provided with laterally extending flanges, or projections, 15 which engage the inner surfaces of the lugs 14 and force the same outwardly as the cylinder moves toward the tread of the tire, the contacting surfaces of the lugs and the flanges being preferably inclined to provide a wedging action which will cause a relatively large pressure to be exerted on the casing. The first movement of the cylinder will cause the edge portions of the casing to be forced apart and into firm engagement with the side walls of the tire. As the resistance to this lateral movement increases the casing as a whole will be moved outwardly toward the tread of the tire, thus causing the outer portion of the casing to be pressed firmly against the outer portion of the tire. It is understood, of course, that the tire is enclosed in a mold during the curing operation and that the pressure exerted thereon by the core will compress the rubber between the core and the mold. Because of the slit edges of the main casing this casing is free to expand and to adjust itself to the internal pressure thereon and thus secure a uniform, adequate pressure throughout all portions thereof.

The pressure member 4, forming a part of the supplemental casing, may be actuated to cause it to exert pressure on the edge portions of the tire, in any suitable manner. It will be noted that the piston 7 is mounted on and rigidly secured to the pressure member and if this pressure member is free to move the air pressure within the cylinder will force the same into contact with the edges of the tire. We have found, however, that more satisfactory results can be had by providing means other than the actuating device within the casing for actuating the pressure member and we have, in the present instance utilized an exterior clamping device for this purpose. As shown in Figs. 2 and 3, the pressure member is provided with an inwardly extending rib 20 which is adapted to be engaged by two clamping rings 21 which are rigidly secured thereto by bolts 22. These clamping rings overlap the joints between the pressure members of adjacent sections and serve to rigidly connect the several core sections and to retain the same in annular form. We utilize these clamping rings to actuate the pressure member 4 so as to cause it to exert pressure on the edge portions of the tire. To this end the inner edge of the rib 20 has laterally extending flanges 23 the outer surfaces of which are beveled, or inclined, as shown at 24. The inner edges of the clamping rings 21 are also beveled and, consequently, as the rings are drawn into engagement with the rib these inclined surfaces will be brought into contact one with the other and will force the ribs and, consequently, the supporting members inwardly. The outer surfaces of the clamping rings are of relatively wide construction and are provided with recesses 25 to receive the bead of the tire and the adjacent edges of these outer portions of the rings overlap the respective edges of the pressure member. Consequently, when the rings are applied to the core the edge portions of the tire will be pressed firmly into contact with the outer surfaces of the rings, which thus form parts of the mold, and this pressure will be maintained during the curing operation.

The core as a whole is of such a character that the tire can be built on the same, thus avoiding the necessity of removing the building core and inserting a curing core, which results in a very material saving of time and labor. It will be noted that the pressure member 4 is arranged between the opposed edges of the main casing and is provided with portions 26 which will engage those edges, when the casing is in its normal or contracted condition, to form a rigid support for the main casing and to give the core sufficient rigidity to enable the tire to be built thereon. Obviously, the tire can not be built on the core when the clamping rings 21 are in position, as they would interfere with the forming of the bead. We have, therefore, provided a second pair of clamping rings, or building rings, 27 adapted to be clamped to the ribs 20 and to connect the several core sections one to the other. These building rings also have their inner edges inclined to cooperate with the inclined surfaces 24 of the flanges 23 on the rib so that the pressure member, which forms part of the core, will be held rigidly in its proper position with relation to the other members of the core. The ribs 20 have in their inner edges recesses 33 to receive the ends of a supporting frame, or spider, 34, upon which the core is mounted during the building operation. In the building of the tire the application of the fabric to the bead gives the same a greater thickness than the bead has in the finished tire. The building rings 27 are cut away so that they can clear this thickened bead portion when they are removed from the core. The curing rings 21 are so shaped that as they are applied to the core the surfaces, or recesses, 25 thereof will engage the inner surfaces of the beads before the inclined surfaces of the rings engage the beveled flanges of the rib. Consequently, the thickness of the beads will not interfere with the placing of the curing rings in position, but when the curing rings are clamped against the ribs 20 the outer surfaces of the rings and the pressure member will be drawn one toward the other, thus compressing the beads of the tire to give them the correct shape and applying pressure thereto which will be maintained throughout the curing operation.

It is important that a fluid tight joint should be maintained between the cylinder and piston of the actuating device within the casing. To accomplish this we have provided the piston 7 at its inner end with an external recess 28 adapted to receive a suitable packing, such as the ordinary steam packing, which can be compressed. In order that we may utilize the pressure of the air within the cylinder to compress this packing and thus force the same firmly into contact with both the cylinder and the piston we have mounted within the cylinder a supplemental piston, or disk, 29 having its edges turned downwardly, as shown at 30, to form an annular flange adapted to enter the recess 28 and to engage the packing. The fluid under pressure is admitted to the cylinder above the disk, or supplemental piston, 29 and to this end a flexible conduit, such as a copper pipe, 31 extends through the disk and is connected at its lower end with the passageway 10 leading to the main conduit 9. It will be apparent, therefore, that when the fluid under pressure is admitted to the cylinder the disk, or supplemental piston, 29 will receive the full pressure of the fluid and will exert a strong pressure upon the packing, thereby insuring a fluid tight joint.

At the abutting ends of the core sections the outer portions of the main casing over lap and they are preferably tapered or beveled, to prevent the formation of a shoulder, which would result in a ridge in the inner surface of the tire. The aprons of the supplemental core abut one against the other.

The supplemental casing also has near its ends inwardly extending lugs 18 engaging the main casing and serving to properly aline the cylinders with the main casing.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In a device of the character described, a tubular casing adapted to fit within a tire or the like and divided longitudinally along one side thereof, a pressure member arranged near the edges of said casing and adapted to exert pressure on the edge portions of said tire, and means for expanding said casing and actuating said pressure member.

2. In a device of the character described, a tubular casing adapted to fit within a tire or the like and divided longitudinally along one side thereof, a pressure member arranged near the edges of said casing and adapted to exert pressure on the edge portions of said tire, means for expanding said casing, and other means for actuating said pressure member.

3. In a device of the character described, a tubular casing adapted to fit within a tire or the like and divided longitudinally along one side thereof, a pressure member arranged near the edges of said casing and adapted to exert pressure on the edge portions of said tire, an actuating device acting on the edge portions of said casing to force the same apart and to move said casing bodily outward, and means for actuating said pressure member.

4. In a device of the character described, a tubular casing adapted to fit within a tire or the like, divided longitudinally along one side thereof and having inwardly extending projections near the respective edges thereof, an actuating device arranged within said casing and comprising a movable part having portions arranged to engage said projections and expand said casing.

5. In a device of the character described, a tubular casing adapted to fit within a tire or the like, divided longitudinally along one side thereof and having inwardly extending projections near the respective edges thereof, an actuating device arranged within said casing and comprising a movable part having portions arranged to engage said projections and expand said casing, and other means for applying pressure to the edge portions of said tire.

6. In a device of the character described, a tubular casing adapted to fit within a tire or the like and divided longitudinally along one side thereof and having inwardly extending projections near its edges, an actuating device arranged within said casing and comprising a movable part having portions arranged to engage said projections and expand said casing, said projections and said portions of said movable part having oppositely inclined contacting surfaces.

7. In a device of the character described, a tubular casing adapted to fit within a tire or the like and divided longitudinally along one side thereof and having inwardly extending projections near its edges, an actuating device arranged within said casing and comprising a movable part having portions to engage said projections and expand said casing, said projections and said portions of said movable part having oppositely inclined contacting surfaces, a pressure member arranged adjacent to the edges of said casing to exert pressure on the edge portions of the tire, and means for actuating said pressure member.

8. In a device of the character described, a tubular casing adapted to fit within a tire or the like and divided longitudinally along one side thereof, an actuating device comprising a part movable toward that portion of said casing opposite the line of said division, said part of said actuating device and said casing having cooperating portions whereby the movement of said part of said actuating device will expand said casing.

9. In a device of the character described, a segmental tubular casing adapted to fit within a tire or the like and divided longitudinally along one side thereof, and a plurality of actuating devices mounted within said casing, each of said actuating devices comprising two parts movable toward and from each other, one of said parts acting on said casing to expand the same, and means connected with the other of said parts to exert pressure on the edge portions of said tire.

10. In a device of the character described, a segmental tubular casing adapted to fit within a tire or the like and divided longitudinally along one side thereof, a plurality of actuating devices mounted within said casing and each comprising two parts movable toward and from each other, one part of each actuating device acting on said casing to expand the same, and a pressure member extending lengthwise of said casing adjacent to the edges thereof, shaped to fit between the edge portions of said tire, and connected with the other parts of said plurality of actuating devices.

11. In a device of the character described, a segmental tubular casing adapted to fit within a tire or the like and divided longitudinally along one side thereof, a plurality of actuating devices mounted within said casing and each comprising two parts movable toward and from each other, one part of each actuating device acting on said casing to expand the same, and a pressure member extending lengthwise of said casing adjacent to the edges thereof, shaped to fit between the edge portions of said tire, and connected with the other parts of said plurality of actuating devices, and means other than said actuating devices for actuating said pressure member.

12. In a device of the character described, a segmental tubular casing adapted to fit within a tire or the like and divided longitudinally along one side thereof, a pressure member extending lengthwise of said casing adjacent to the edges thereof, and shaped to fit within the edge portions of said tire, aprons secured to the respective edges of said pressure member, shaped to conform to the edge portions of the tire and overlapping the respective edge portions of said casing, and means for expanding said tubular casing and for actuating said pressure member to cause it to act upon the edge portions of said tire.

13. In a device of the character described, a segmental tubular casing adapted to fit within a tire or the like and divided longitudinally along one side thereof, a pressure member extending lengthwise of said casing adjacent to the edges thereof, and shaped to fit within the edge portions of said tire, aprons secured to the respective edges of said pressure member, shaped to conform to the edge portions of the tire and overlapping the respectively edge portions of said casing, and independently operated means for expanding said casing and for actuating said pressure member.

14. In a device of the character described, a segmental tubular casing adapted to fit within a tire or the like and divided longitudinally along one side thereof, a pressure member extending lengthwise of said casing adjacent to the edges thereof, and shaped to fit within the edge portions of said tire, aprons secured to the respective edges of said pressure member, shaped to conform to the edge portions of the tire and overlapping the respective edge portions of said casing, means for actuating said pressure member to cause it to exert pressure on the edge portions of the tire, and an actuating device movably mounted on said pressure member and operatively connected with said tubular casing to expand the same.

15. In a device of the character described, a segmental tubular casing adapted to fit within a tire or the like and divided longitudinally along one side thereof, a pressure member extending lengthwise of said casing adjacent to the edges thereof, and shaped to fit within the edge portions of said tire, aprons secured to the respective edges of said pressure member, shaped to conform to the edge portions of the tire and overlapping the respective edge portions of said casing, a piston mounted on said pressure member, a cylinder embracing said piston, means for operatively connecting said piston with said casing to expand the latter, and means for admitting fluid under pressure to said cylinder.

16. In a device of the character described, a segmental tubular main casing adapted to fit within a tire or the like and divided longitudinally along the inner side thereof, a supplemental casing fitting about the edge portions of said main casing and comprising a rigid supporting member extending lengthwise of said main casing adjacent to the edges thereof, and a plurality of actuating devices carried by said supporting member within said main casing and each comprising a movable part operatively connected with said main casing to expand the same.

17. In a device of the character described, a tubular casing adapted to fit within a tire or the like, an actuating device arranged within said casing and comprising a cylinder having operative connection with said casing to expand the same and a piston mounted in said cylinder, a pressure member connected with said piston and arranged to exert pressure on the edge portions of said tire, and means for introducing fluid under pressure into said cylinder to force said cylinder and said piston apart.

18. In a device of the character described, a tubular casing adapted to fit within a tire or the like, an actuating device arranged within said casing and comprising a cylinder having operative connection with said casing to expand the same and a piston mounted in said cylinder, a pressure member connected with said piston and arranged to exert pressure on the edge portions of said tire, means for introducing fluid under pressure into said cylinder to force said cylinder and said piston apart, and means other than said actuating device to actuate said pressure member.

19. In a device of the character described, a tubular casing adapted to fit within a tire or the like and divided longitudinally along one side thereof, an actuating device mounted within said casing and comprising a cylinder connected with and movable relatively to said casing, said connection being such as to cause the casing to be expanded by the movement of said cylinder, a piston mounted in said cylinder, and a part rigidly secured to said piston and arranged adjacent to the edges of said casing to exert pressure on the edge portions of the tire, and means to introduce fluid under pressure into said cylinder.

20. In a device of the character described, a tubular casing adapted to fit within a tire or the like, and divided longitudinally along one side thereof, a supplemental casing comprising a supporting member extending lengthwise of the first mentioned casing adjacent to the line of said division, and aprons carried by said supporting member and overlapping the adjacent edges of the first mentioned casing, said supplemental casing being adapted to fit between the edge portions of a tire, a plurality of actuating devices mounted within said first mentioned casing and each comprising a cylinder movable relatively to said first mentioned casing and having operative connection therewith to expand the same, and a piston mounted in each cylinder and rigidly connected with the supporting member of said supplemental casing, said supporting member having a fluid conduit extending lengthwise thereof, communicating with the cylinder of each of said actuating devices and adapted to be connected with a source of supply for fluid under pressure.

21. In a device of the character described, a tubular casing adapted to fit within a tire or the like divided longitudinally along one side thereof, and having transverse slits in the edge portions thereof dividing the same into a plurality of sections, inwardly extending lugs rigidly secured to the respective sections near the edges of said casing, an actuating device mounted within said casing and comprising two parts movable toward and from each other, one of said parts having portions to engage the respective projections on the sections of said casing, and means connected with the other of said parts to exert pressure on the edge portions of said tire.

22. In a device of the character described, a plurality of sections arranged end to end, each section comprising a main casing divided longitudinally along one side thereof and a supplemental casing overlapping the edge portions of said main casing, said supplemental casing of one section extending beyond the end thereof and overlapping the main casing of the adjacent section, and a part carried by the main casing of the last mentioned section to overlap that part of the main casing of the first mentioned section opposite said supplemental casing, and means acting on said main casing to expand the latter, and means to exert pressure on said supplemental casing.

23. In a device of the character described, a tubular casing adapted to fit within a tire or the like and divided longitudinally along one side thereof, and an actuating device acting on said casing to expand the same, and a pressure member connected with said actuating device, shaped to fit between the converging edge portions of said tire and adapted to exert pressure on said portions of said tire, said member having a part arranged between the opposed edges of said casing to form a support therefor.

24. In a device of the character described, a segmental tubular casing adapted to fit within a tire or the like, divided longitudinally along the inner side thereof and having its edges spaced apart, a member extending lengthwise of said casing, shaped to fit between the edge portions of the tire and having a part arranged between the opposed edges of said casing and adapted to engage said edges and form a support therefor, and means carried by said member and arranged within said casing for expanding said casing.

25. In a device of the character described, a tubular casing adapted to fit within a tire or the like and divided longitudinally along one side thereof, a pressure member extending lengthwise of said casing near the edges thereof and arranged to exert pressure on the edge portions of the tire, means arranged within said casing to expand the same, and means arranged externally of said casing to actuate said pressure member.

26. In a device of the character described, a tubular casing adapted to fit within a tire or the like and divided longitudinally along one side thereof, a pressure member extending lengthwise of said casing near the edges thereof and adapted to exert pressure on the edge portions of the tire and having a rib extending inwardly beyond said tire, said rib having inclined surfaces, and clamping rings arranged in the opposite sides of said rib and having inclined surfaces to cooperate with the inclined surfaces of said rib.

27. In a device of the character described, a tubular casing adapted to fit within a tire or the like and divided longitudinally along one side thereof, a pressure member extending lengthwise of said casing near the edges thereof and adapted to exert pressure on the edge portions of the tire and having a rib extending inwardly beyond said tire, said rib having inclined surfaces, and clamping rings arranged on the opposite sides of said rib and having inclined surfaces to cooperate with the inclined surfaces of said rib, and also having their outer surfaces arranged to engage the edges of said tire and support the same against the pressure of said pressure member.

28. In a device of the character described, a tubular casing adapted to fit within a tire or the like and divided longitudinally along one side thereof, a pressure member extending lengthwise of said casing near the edges thereof and adapted to exert pressure on the edge portions of the tire, means for actuating said pressure member, a fluid operated device arranged within said casing and operatively connected with the said casing to expand the same, said pressure member having a conduit extending lengthwise thereof and adapted to be connected with a source of fluid supply, and means for connecting said conduit with said fluid operated device.

29. In a device of the character described, a tubular casing adapted to fit within a tire or the like and divided longitudinally along one side thereof, a pressure member extending lengthwise of said casing near the edges thereof and adapted to exert pressure on the edge portions of the tire, said pressure member having a conduit adapted to be connected with a source of fluid supply, an actuating device arranged within said casing and comprising a piston mounted on said pressure member, a cylinder movably mounted on said piston and operatively connected with said casing to expand the same, and a conduit connecting said cylinder with the conduit in said pressure member.

30. In a device of the character described, a tubular casing adapted to fit within a tire or the like and divided longitudinally along one side thereof, a pressure member extending lengthwise of said casing near the edges thereof and adapted to exert pressure on the edge portions of the tire, said pressure member having a conduit adapted to be connected with a source of fluid supply, an actuating device arranged within said casing and comprising a piston mounted on said pressure member, a cylinder movably mounted on said piston and operatively connected with said casing to expand the same, a conduit connecting said cylinder with the conduit in said pressure member, packing interposed between said piston and said cylinder, and fluid operated means for compressing said packing.

31. In a device of the character described, a tubular casing adapted to fit within a tire or the like and divided longitudinally along one side thereof, a pressure member extending lengthwise of said casing near the edges thereof and adapted to exert pressure on the edge portions of the tire, said pressure member having a conduit adapted to be connected with a source of fluid supply, an actuating device arranged within said casing and comprising a piston mounted on said pressure member, a cylinder movably mounted on said piston and operatively connected with said casing to expand the same, a conduit connecting said cylinder with the conduit in said pressure member, said piston having an external recess at its inner end to receive a packing, and a fluid operated member having a part extending into said recess to engage said packing and compress the same.

32. In a device of the character described, a tubular casing adapted to fit within a tire or the like and divided longitudinally along one side thereof, a pressure member extending lengthwise of said casing near the edges thereof adapted to exert pressure on the edge portion of the tire, said pressure member having a conduit adapted to be connected with a source of fluid supply, an actuating device arranged within said casing and comprising a piston mounted on said pressure member, a cylinder movably mounted on said piston and operatively connected with said casing to expand the same, said piston having an external recess at the outer end thereof adapted to receive a packing, a supplemental piston extending across said cylinder and having a part adapted to enter said recess, and engage the packing therein, and a conduit connecting the conduit in said pressure member with said cylinder above said supplemental piston.

In testimony whereof, we affix our signatures hereto.

HARRY P. KOENNEKE.
WALTER F. MILLER.